United States Patent

Scelze

[15] 3,701,501
[45] Oct. 31, 1972

[54] AIRPORT DESIGN

[72] Inventor: Robert G. Scelze, 1848 Sunnyside Avenue, Westchester, Ill. 60153

[22] Filed: Nov. 16, 1970

[21] Appl. No.: 89,908

[52] U.S. Cl. .............................................. 244/114 R
[51] Int. Cl. ................................................ B64f 1/18
[58] Field of Search ................................... 244/114 R

[56] References Cited

UNITED STATES PATENTS

| | | | |
|---|---|---|---|
| 1,850,490 | 3/1932 | Bahl | 244/114 R |
| 2,400,841 | 5/1946 | Rogers | 244/114 R |
| 2,522,144 | 9/1950 | Stump | 244/114 R |
| 3,157,374 | 11/1964 | Conrey | 244/114 R |
| 3,325,124 | 6/1967 | Bary | 244/114 R |
| 3,333,796 | 8/1967 | Bary | 244/114 R |

Primary Examiner—Milton Buchler
Assistant Examiner—Paul E. Sauberer
Attorney—Nathan N. Kraus and Joseph R. Marcus

[57] ABSTRACT

An aircraft landing and take-off facility having a center area and two circular runways surrounding the center area. Two series of indicia visible to an approaching aircraft are provided for indicating straight runways in a plurality of compass directions in which an aircraft should take off or land in accordance with prevailing wind directions. The take-off or acceleration run of the aircraft is initiated on one of the circular runways with flying speed attained on one of the straight runways. Landing of the aircraft is initiated on a straight runway with deceleration accomplished on the same circular runway.

7 Claims, 2 Drawing Figures

AIRPORT DESIGN

BACKGROUND OF THE INVENTION

This invention relates generally to landing and take-off facilities and in particular to a new concept of airport design for use by aircraft. The growing increase in the numbers of aircraft both in commercial and general aviation has affected the capacities of substantially all of the landing and take-off facilities in the country involved in aircraft movement. Current airport designs are based on the concept that an aircraft must maintain a straight line of travel over the surface of a runway from the beginning of a take-off run until it is airborne and that the aircraft must remain in a straight line of travel over the runway from the point of touch-down until the landing roll is completed. In attempting to keep pace with current needs, it is the present practice to increase the capacity of an airport by lengthening existing runways or by building additional runways paralleling existing runways. Unfortunately, this practice falls far short of meeting the increasing demands for runway availability. Further, the practice is becoming economically prohibitive in view of the rising land and construction costs and constitutes a wasteful utilization of available land.

SUMMARY OF THE INVENTION

It is an object of my invention to provide adequate airport facilities at lesser cost and with significantly better utilization of land than is possible with existing airport arrangements. My invention is based on the concept that an aircraft should move in a curvilinear path rather than in a straight line of travel over the runway surface from the beginning of take-off roll until airborne and, similarly, should move in a curvilinear path rather than a straight line of travel over the runway from touchdown until the landing roll is completed to most effectively utilize an airport surface.

During the acceleration run of an aircraft when taking off, the initial portion of the run is not required to take place in a straight line, but may be accomplished in a curvilinear path. It is only the final portion of the acceleration run as the aircraft reaches flying speed that it is desirable to maintain a straight line of travel over the runway and into the wind. In accordance with my invention, a circular runway of unlimited length is provided in which to complete the initial take-off roll. Similarly, during the landing roll, after touch-down, it is only during the first portion of the landing roll when speeds are high that it is desirable to maintain a straight line of travel over the runway and into the wind. The final portion of the landing roll and deceleration may be accomplished on a curvilinear path over the runway surface. My invention reduces the straight length requirements for a landing surface and utilizes all of the area of the landing surface efficiently so as to provide a runway of unlimited length in which to complete a landing roll.

Another object of my invention is the provision of an airport design which affords improved safety both to aircraft and passengers. An airport design in accordance with my invention eliminates the necessity for making cross-wind landings and take-offs. In addition, there are no narrow straight runways to run off and no surface obstructions. The entire surface is level and obstruction free so that momentary or slight loss of control of an aircraft will not result in injury. On aborted take-offs an endless curvilinear path is provided for decelerating the aircraft to a safe and complete stop.

Still another object of my invention is the provision of an airport design which lends itself to standardization in relation to layout, identification and marking of runways and direction of aircraft movement and to a simplified arrangement of lighting for night time operations. Thus, all such airports could be uniform or identical regardless of their geographical location, with the result that pilot training could be simplified requiring knowledge of only one kind of airport layout and techniques of taking off or landing in such airport.

Still a further object of my invention is the provisions of a system of parallel runways in an infinite number of directions which can function effectively to accommodate a larger number of arrivals and departures of airplanes in a given period of time before becoming saturated.

Other and further objects and advantages of this invention will become apparent from the following description when considered in connection with the accompanying drawings.

BRIEF DESCRIPTION OF THE PREFERRED EMBODIMENT

Figure 1:
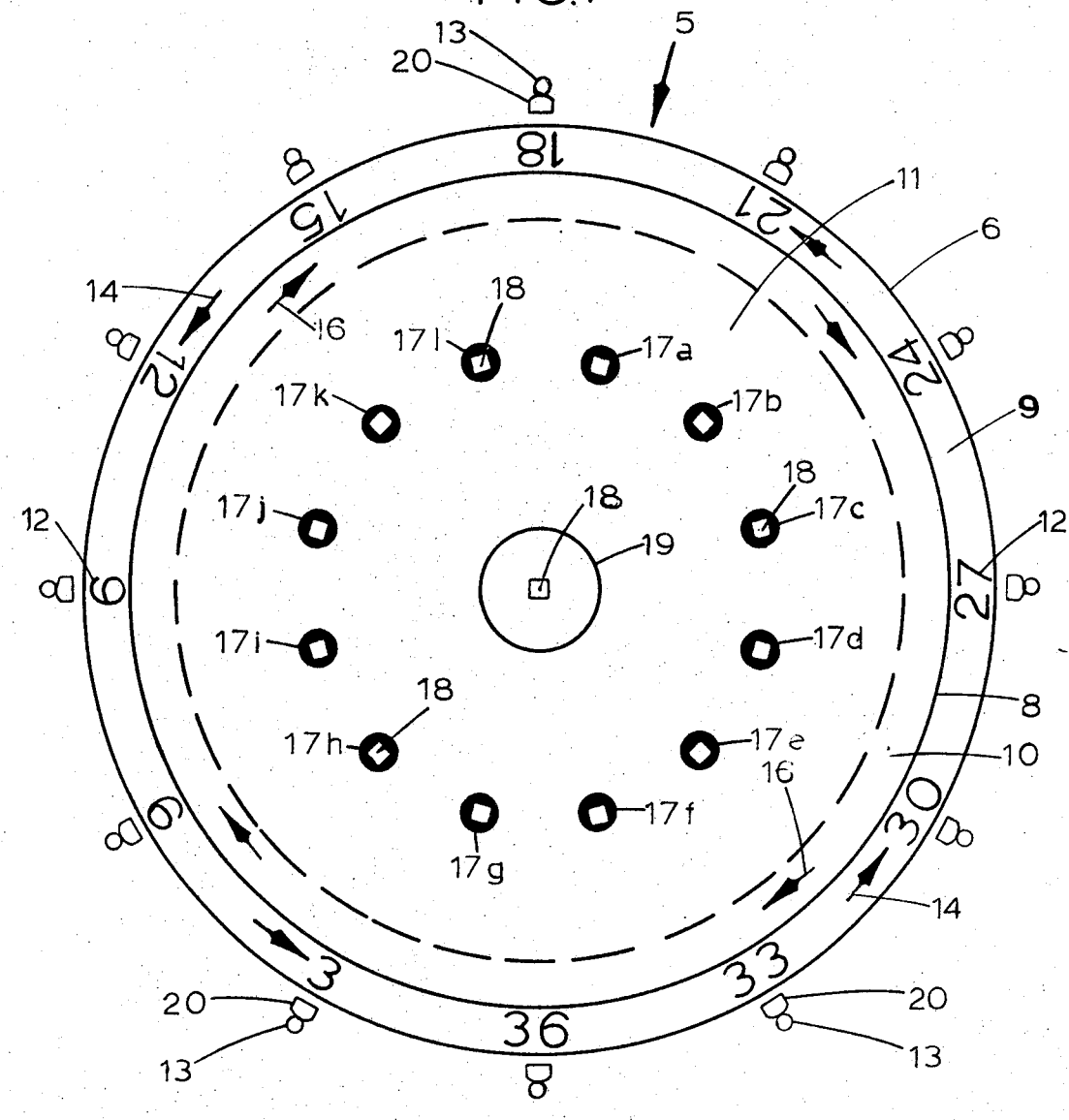
FIG. 1 is a plan view of a preferred embodiment of my invention.

Referring to the drawings, my invention comprises a circular area 5 delineated by a circular line or stripe 6, having a diameter of approximately 1,300 feet more or less depending upon local requirements. The circular area 5 may be located on a square plot of land of approximately 40 acres and the area outside of the circular line 6 may be utilized for buildings, parking, storage etc. The surface of the circular area 5 may comprise concrete, asphalt, sod or other suitable material. A circular stripe 8 concentric with the circle 6 is painted or otherwise applied to the surface 5 and defines with the circle 6 a circular runway 9 having a width of approximately 50 feet. Preferably, the circular area 11 enclosed within the circle 6 is of the same color or surface texture while the stripes 6 and 8 together with the directional arrows, numerals and other markings, hereinafter to be described, are painted with a contrasting phosphorescent paint so as to stand out prominently from the background surface. A series of numerals 12 designating conventional heading markings are painted at 30 degree intervals in the circular runway 9. These numerals serve to identify respective runways, as will be hereinafter explained, and each numeral is illuminated by a flood light 20 and high intensity strobe light 13 positioned exteriorly of the circle 6. A series of arrows 14 is painted in the runway 9, all pointing in a counter-clockwise direction as viewed in FIG. 1. A similar series of arrows 16 is painted on the surface area 11 in an annular area 10 adjacent to runway 9 and these arrows point in a clockwise direction. The area 10 constitutes a landing and take-off runway, as will be hereinafter described.

A series of circles 17a—17l are painted on the surface 11 within the area of circular stripe 8 and are arranged at 30 degree intervals on a circle which is concentric to the circular stripe 8. It will be noted that the circles 17 are disposed midway between consecutive heading markings 12. An inrunway light 18 is disposed in the center of each of the circles 17 and also at the center of the circular area 11. A bulls eye circle 19 is painted in the center of the area 11 concentric with the circular stripe 8.

Figure 2:
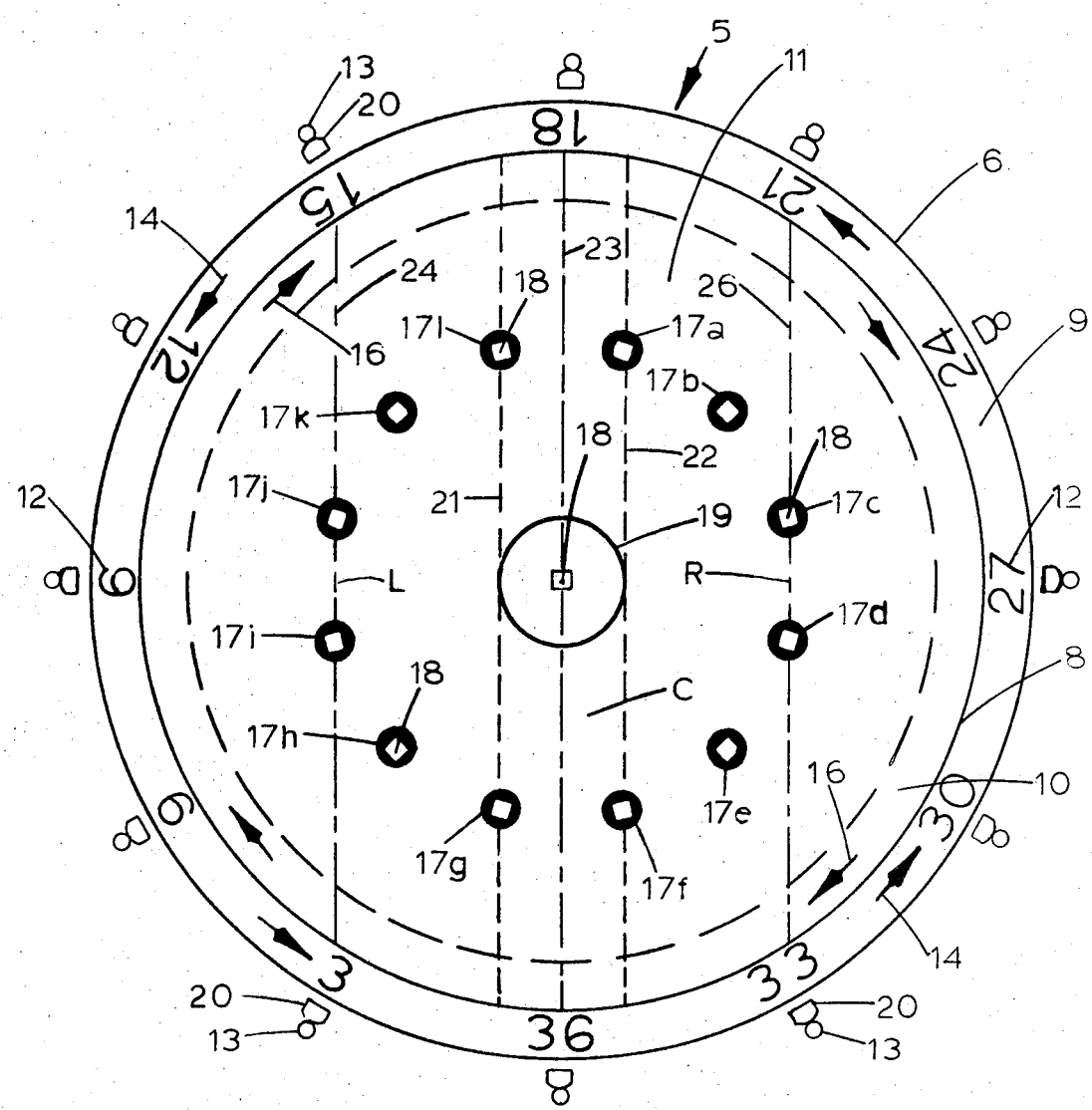
FIG. 2 is a similar view illustrating parallel runways on the landing and take-off surface.

Referring to FIG. 2, the bulls eye circle 19 is tangent at opposite diametrical points, to two imaginary parallel lines 21 and 22 passing through the centers of circles 17g, 17l and 17f, 17a, respectively. The space between the lines 21 and 22 constitutes the center C runway designated by an imaginary radial line 23 corresponding to the heading marking 36. It will be understood that the invention contemplates the use of other runways corresponding to the various heading markings in all compass directions. Thus, the center runway C under certain wind conditions at any one time could correspond to an imaginary radial line passing through heading marking 33, 30 and 27 or any other heading marking.

In addition to the center runway C two additional parallel runways L and R are provided and these are disposed to the left and right of the center runway. For example, the left runway L coincides with an imaginary line 24 passing through the heading markers 3 and 15 and the centers of the circles 17i and 17j. Correspondingly, the right runway R coincides with an imaginary line 26 passing through the heading markers 33 and 21 and the centers of the circles 17c and 17d. It will be understood that as the center runway C assumes a different angular relationship, as hereinabove described, the right and left parallel runways R and L assume corresponding parallel relationships.

In use of the airport of my invention taxiing of all aircraft is effected in the circular runway 9 in a counter-clockwise direction, as indicated by the arrows 14. A take-off or acceleration run is initiated on the runway 10 inwardly adjacent to runway 9, in a clockwise direction, sufficiently in advance of a straight runway, C, L or R then operational, to enable a sweeping right turn to be made onto one of the operational runways for example, C or L at a speed which is high enough so that flying speed of the aircraft will be reached safely in the runway length. A small aircraft would effect a turn from runway 10 onto the operational runway at a speed of approximately 30 to 35 miles per hour. On take-off, the pilot would be facing in a direction to clearly see landing approaches of other aircraft.

It is noted that the distances between the parallel straight runways C, L and R are sufficient to accommodate landing or take-off of three planes simultaneously. The center runway C in a field size, as hereinabove noted, would have a width of approximately 200 feet.

It will be understood that the angular directions of the straight runways which are operational at any particular time may vary in accordance with changes in wind direction. However, the same arrangement of runways obtains regardless of their angular direction.

In effecting a landing, a pilot aligns the aircraft with the appropriate operational runway as indicated by the heading markers 12 and the circles 17 together with the bulls eye circle 19 with the touch-down preferably taking place between the circular stripe 8 and the circular arrangement of circles 17. Initial deceleration of the aircraft is effected in an operational runway such as C, L or R and the a sweeping right turn is begun at a safe speed so that the aircraft may be guided along the circular runway 10 for deceleration. When the aircraft speed has been reduced sufficiently, a left turn into runway 9 is then made in order to complete the landing.

The center and left straight runways C and L respectively, preferably are used for landing while the center and right runways C and R respectively, preferably are used for take-off. In night operation only the heading markers 12 indicating the center and adjacent parallel runways which are operational at any one time will be illuminated by floodlights 20 and strobe lights 13. Reciprocal heading markers will be illuminated only by floodlights 20 no strobe lights being used in this instance. The circles 17 and the center bulls eye circle 19 will be illuminated at all times by lights 18. It is contemplated that the landing and taxi lights of the aircraft will provide adequate auxiliary lighting.

It will be seen from the foregoing that I have provided a landing and take-off facility which provides for an endless length of runway in which to effect take-off and landing maneuvers of an aircraft with the critical portions of these maneuvers taking place in a straight line of travel over the surface and into the wind. The circular landing and take-off surface provides for an infinite number of available runways and parallel runways so as to reduce the crosswind component on the aircraft to zero during take-off and landing maneuvers. The landing and take-off surface is easily recognizable by a pilot so that pilot training requirements are reduced, thereby tending to an increase in safety of operation because of the standardization and simplification of the arrangements in the marking and lighting.

The landing surface may be tailored to local requirements without any loss of advantages of the basic design by simply decreasing or increasing the diameter of the circular surface area.

I claim:

1. An aircraft landing and take off facility comprising a flat unobstructed surface including a center area and at least one circular runway surrounding said center area, said circular runway bearing a first series of indicia angularly spaced apart substantially at 30 degree intervals, said center area bearing a second series of indicia angularly spaced apart substantially at 30 degree intervals on a circle concentric with said circular runway, the indicia of said second series being disposed angularly medially between consecutive indicia of said first series, all of said indicia being visible to an approaching aircraft, certain of said indicia being in straight linear alignment and delineating a straight runway, there being a plurality of such runways extending in a plurality of different compass directions, and visible signal means associated with each indicium and adapted to be selectively energized to indicate to an approaching aircraft a particular straight runway to be utilized by said aircraft on taking off or on landing in accordance with prevailing wind direction.

2. The invention as defined in claim 1 in which any two consecutive indicia of said second series will be in substantially straight linear alignment with two indicia of said first series which are spaced 120 degrees apart.

3. The invention as defined in claim 1 including a second circular runway inwardly adjacent to and concentric with said first mentioned circular runway.

4. The invention as defined in claim 1 in which the circular runway constitutes a surface on which an acceleration run on take off of the aircraft is initiated or the deceleration run of the aircraft upon landing is completed.

5. The invention as defined in claim 3 in which the first mentioned circular runway constitutes the taxiing surface for the aircraft.

6. The invention as defined in claim 1 in which one of the straight runways constitutes a surface on which flying speed of the aircraft is achieved.

7. The invention as defined in claim 1 in which one of the straight runways constitutes a surface on which initial deceleration of the aircraft immediately upon landing is effected.

* * * * *